United States Patent
Diaz

(10) Patent No.: US 10,030,516 B2
(45) Date of Patent: Jul. 24, 2018

(54) ARTICULATED LINER SYSTEM FOR MINING EQUIPMENT AND ASSOCIATED METHODS

(71) Applicant: VITA NOVA SPA, Las Condes, Santiago (CL)

(72) Inventor: Cristian Diaz, Santiago (CL)

(73) Assignee: VITA NOVA SPA, Santiago (CL)

( * ) Notice: Subject to any disclaimer, the term of this patent is extended or adjusted under 35 U.S.C. 154(b) by 0 days.

(21) Appl. No.: 15/421,627

(22) Filed: Feb. 1, 2017

(65) Prior Publication Data
US 2017/0217685 A1  Aug. 3, 2017

(30) Foreign Application Priority Data
Feb. 1, 2016  (CL) ................... 2016-00259

(51) Int. Cl.
*B65D 1/40* (2006.01)
*E21F 17/00* (2006.01)
*B65G 11/16* (2006.01)

(52) U.S. Cl.
CPC ............ *E21F 17/00* (2013.01); *B65G 11/166* (2013.01)

(58) Field of Classification Search
CPC ....... E21F 17/00–17/185; B65G 11/00–11/166
USPC ............... 220/694, 729, 4.09, 494, 600–638
See application file for complete search history.

(56) References Cited

U.S. PATENT DOCUMENTS

| | | | | |
|---|---|---|---|---|
| 2,778,173 A | * | 1/1957 | Taunton | B65D 33/01 206/524.8 |
| 4,727,881 A | * | 1/1988 | Craighead et al. | 600/394 |
| 6,803,090 B2 | * | 10/2004 | Castiglione | B32B 7/02 428/172 |
| 7,232,023 B2 | | 6/2007 | Ellis et al. | |
| 9,139,366 B2 | | 9/2015 | Berroth et al. | |
| 2008/0053785 A1 | | 3/2008 | Neville et al. | |
| 2010/0320111 A1 | * | 12/2010 | Maier | A61K 9/703 206/438 |
| 2015/0024230 A1 | | 1/2015 | Wark | |

FOREIGN PATENT DOCUMENTS

| | | |
|---|---|---|
| AU | 2011200813 A1 | 3/2011 |
| CA | 2792372 A1 | 9/2010 |
| WO | 2008105697 A1 | 9/2008 |
| WO | 2014199390 A1 | 12/2014 |

* cited by examiner

*Primary Examiner* — Kareen Thomas
(74) *Attorney, Agent, or Firm* — Daniel F. Nesbitt; Hasse & Nesbitt LLC

(57) ABSTRACT

An articulated liner system for the protection of mining equipment surfaces subject to impact and abrasive wear caused by the circulation, loading and/or transport of ores, having a one-piece liner mat and an anchorage assembly with a first part having one mat fastening means and a second part having at least one supporting means for the anchorage assembly. The supporting means is fixed to a reference surface of the mining equipment. The liner mat is fixedly arranged in the one mat fastening means of the first part of the anchorage assembly. The first part of the anchorage assembly is joined to the second part of the anchorage assembly, enabling the mat to be arranged over the mining equipment surface when the joint between the first and the second parts of the anchorage assembly is driven. A method of installation, maintenance and manufacture is also provided.

24 Claims, 14 Drawing Sheets

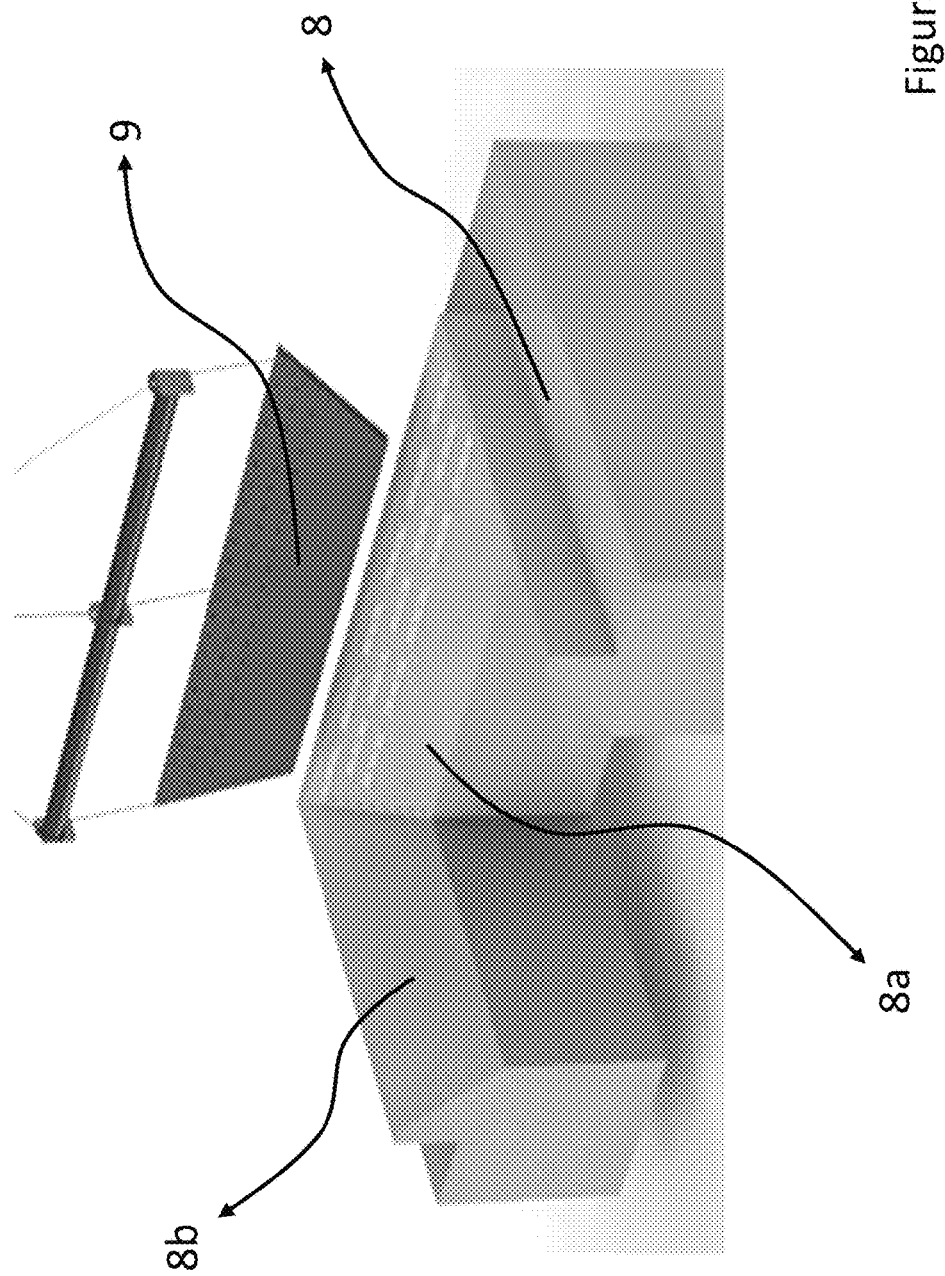

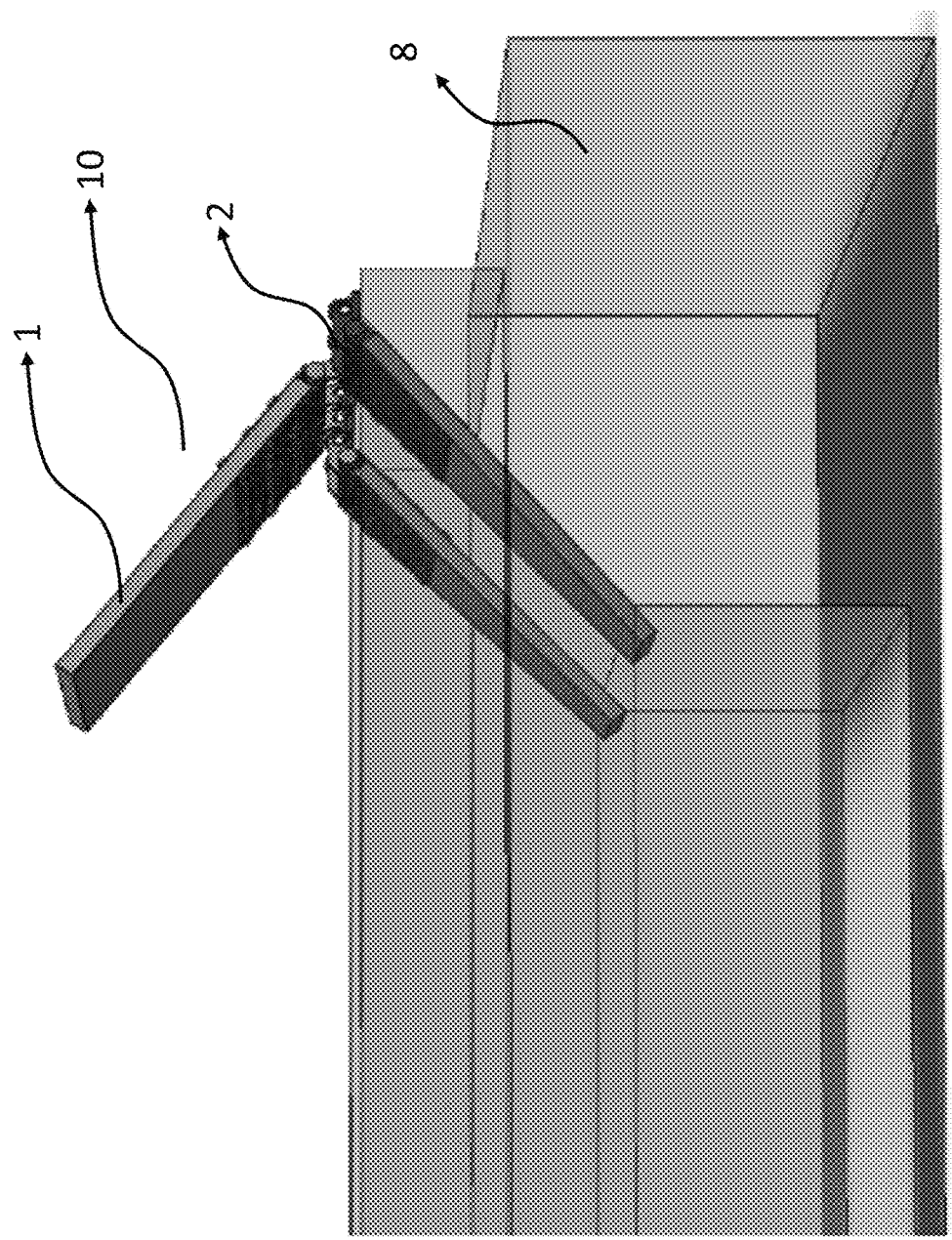

ARTICULATED LINER SYSTEM FOR MINING EQUIPMENT AND ASSOCIATED METHODS

FIELD OF APPLICATION

The present invention describes an articulated liner system for the protection of mining equipment surfaces, wherein said surfaces are usually subject to impact and/or abrasive wear caused by the circulation, loading and transport of materials or ores.

Additionally, the invention refers to the manufacturing method of the articulated liner system and to the installation and maintenance methods associated with said liner system and their implementation at those worksites involving the transport of materials or ores.

BACKGROUND OF THE INVENTION

The use of liners in the surface of mining equipment subject to impact and/or abrasive wear is currently a common standard at worksites. In fact, most of the surfaces having worn due to the abrasive action of ores and/or chemicals circulating through the mining equipment are covered with rubber mats or other protecting materials, so that to reduce the damage of said surfaces and/or to avoid the high costs involved in repairing the same. Additionally, the repair and/or maintenance of certain mining equipment causes all operations of the mine to stop; therefore, it is sought that these operations are the less invasive as possible with the reduction of unavailability time of the equipment being important.

In this context, there are several solutions at present to provide liners for the mining equipment surface, the most outstanding being those associated with the use of a plurality of rubber plates or boards fixed to the walls or surfaces to be coated. Said plurality of rubber plates form a rubber layer exposed to the contact with the ore, thus protecting the surface of the equipment against the wear from the impact and/or abrasive wear of said ore. For example, documents CA 2792372, AU 2011200813 and U.S. Pat. No. 9,139,366 refer to liner systems formed by a plurality of liner plates installed on the walls of the mining equipment, thus protecting against the impact and/or abrasive wear generated by the ore circulating during the operation of said equipment. The solutions disclosed in said documents propose the protection of the mining equipment wall or surface by a plurality of plates fixed to the wall, with those plates having different geometric shapes and different coupling arrangements among plates. Generally, according to the prior art, each plate has anchorage means for fastening to the mining equipment wall or surface, with the installation of several rubber plates on the surface being necessary in order to achieve the protection desired all over the wear area.

The patent application US 2015/0024230 refers to methods and apparatus for installing wear-resistant liner plates in equipment requiting protection. Said document discloses the need of having elements to facilitate the handling of plates during installation and/or maintenance methods, proposing means to lift each plate by itself, placing and fastening it later on the surface area to be lined. This method is useful for the installation of plates on vertical surfaces, wherein the installation time usually increases due to the complexity associated with the operations of installation on said kind of surfaces. In addition, the liner plates are usually conformed as a composite material with an external layer of abrasive resistant material, for example rubber, and another inner layer to fasten the plate to the wall being protected. Usually, said inner layer is a metal plate that makes its fastening to the surface to be protected easier by using fastening means as bolts and nuts or by using welded joints between the plate and the surface to protect.

Therefore, although the document US 2015/0024230 seeks to facilitate the installation and/or maintenance by special means provided to lift and handle the rubber plates, said method will anyway include the need of fastening the plates to the surface one by one, using conventional means therefor and resulting in undesirable delays in the installation/maintenance methods.

Other solutions for the lining of mining equipment walls or surfaces offer different fastening arrangements than the conventional ones (use of bolts and/or weld). For example the document of U.S. Pat. No. 7,232,023 refers to an ore chute with a liner formed by a plurality of plates fastened by coupling systems between the plates and the surface to be lined. The solution proposed by said document defines fixing elements on the wall or surface to line, wherein said fixing elements have coupling areas to receive insertion means from the plates, fixing them to the wall of the equipment by pressure. Said arrangement facilitates the installation of the plates on the surface to be lined, but it does not prevent each one of the plates from being installed on the wall or surface of the equipment independently, i.e. it does not allow reducing the down time of the equipment destined to the installation, repair and/or replacement of plates due to the great number of plates to be installed/repaired.

In addition, there are solutions that use rubber plates with metallic inserts to fix said plated to the walls or surface of the mining equipment. Among said solutions, we have that disclosed in document US 2008/0053785, wherein a set of flexible liners is proposed for a chute, wherein the fixation of said liners is made through a system that use the metallic inserts present in the liner that engage with the fixing means provided on the mining equipment surfaces. In this respect, also the document WO 2014/199390 proposes a hanging fixing system for liner plates, wherein said plates have a special hook-type shape allowing its insertion to a clamp fixed on the mining equipment surface, with the liners being arranged on the mining equipment wall in a hanging way. This solution is similar to that disclosed in document WO 2008/105697, wherein the surface to be protected has plate brackets wherein said plates are arranged in a hanging way.

The solutions shown in the prior known art allow an easier mounting of the liner plates on the mining equipment surfaces to be protected, but they do not solve the problem resulting from the multiplicity of plates that should be used to protect the wide surfaces of wear of the mining equipment, as the inlet chute of a primary crusher, the walls of chutes and/or surface of chutes. Therefore, a liner system is required that allows facilitating both the installation and maintenance of the system on the surface of the mining equipment to be protected, thus achieving the objects of significantly reducing the number of parts or plates used in making the protecting layer of liner and simplifying the operations of installation and maintenance required to keep the mining equipment available for operation as much as possible, i.e. to reduce the unavailability time of the mining equipment.

DESCRIPTION OF THE INVENTION

The present invention consists in an articulated liner system for the protection of mining equipment surfaces, which are usually subject to impact and/or abrasive wear caused by the circulation, loading and transport of materials or ores. The articulated liner system of the invention allows an easier installation and maintenance of the liner by proposing a solution to reduce the number of parts necessary to protect the surface and to simplify the operations of installation and maintenance. Additionally, said system allows reducing the unavailability time of critical equipment for the mining works, solving the drawbacks of the solutions of the prior known art mentioned above.

The articulated liner system of the present invention comprises a lining mat formed in just one piece as a protection element for the surface to be lines. Said liner mat can be formed in one or more layers of a polymer or rubber material, such as rubber, and by any other material or combination of material being resistant to impact and abrasive wear. In an embodiment of the invention for example, said liner mat can comprise high-resistance materials embedded inside the mat, such as a mesh made up by fibers as Kevlar® or metallic reinforcements, and/or reinforcement of additional layers provided locally or along the whole mat or combinations of the above.

In addition, according to the alternative embodiments of the invention, the liner mat can be formed by other type of materials, as ceramic compounds or other materials or combinations derived from the teachings present in the art.

Additionally, the articulated liner system comprises an anchorage assembly to place the liner mat on the surface to be lined. Said anchorage assembly is formed by at least two main parts, wherein said parts are joined each other, preferably through an articulated or pivoting joint. The first part of the anchorage assembly is arranged to fasten the liner mat, comprising at least one fastening means of the mat to fix the liner mat to the anchorage assembly. The second part of the anchorage assembly is provided to anchor the liner system of the mining equipment being protected, comprising at least one supporting means to anchor and fasten the liner system to a reference surface of the mining equipment to be protected. In this respect, the driving of the articulated or pivoting joint between the first and second part of the anchorage assembly allows the liner mat to be arranged in an articulated way on the mining equipment surface, regardless of the inclination of said surface.

According to a preferred embodiment of the invention, the anchorage assembly corresponds to a hinge-type assembly, wherein the articulated or pivoting joint between the first and the second part of said assembly is performed through a pin allowing the rotation between a first half of the joint and a second half of the joint. In this context, the second part of the anchorage assembly is arranged fixedly on the mining equipment to be protected, comprising the second half of the articulated or pivoting joint, while the first part of the anchorage assembly rotates together with the liner mat, which is fixedly joined to said first part, comprising the first half of the articulated or pivoting joint. The articulated movement between the first and the second part of the anchorage assembly simplifies the installation and maintenance of the liner system, allowing the easy replacement of the components exposed to wear and facilitating the installation of the spare parts. In this respect, the articulated or pivoting joint of the anchorage assembly can comprise any type of joint allowing the first part of the anchorage assembly to pivot in relation to the second part thereof, wherein the latter is arranged fixed to a reference surface of the mining equipment.

Additionally, according to the preferred embodiment of the invention, the fastening means of the first part of the anchorage assembly allow fixing the liner mat to said anchorage assembly, wherein said fixation is performed by a detachable joint that allows separating the mat from the liner system, whether by replacement or repair. Said detachable joint is achieved by fixation means as bolts or other conventional fixing means, which are arranged in the fastening means for fixing the mat to the anchorage assembly.

In this context, a preferred embodiment of the present invention considers that the fastening means of the first part of the anchorage assembly are made up by a fastening bracket provided to fix the liner mat to the anchorage assembly. Said fastening bracket has teeth that press the liner mat over at least portion of its upper part, fixing it to the structure of the first part of the anchorage assembly by the pressure effect among the teeth, bolts or other fixing means provided in the teeth that prevents the free separation of the anchorage assembly mat. The at least one fastening means can comprise at least one bracket with a plurality of teeth, which will depend on questions related to the design of the liner system, as for example the size and weight of the liner mat. Additionally, the extension of the fastening means will also depend on design-associated questions. It should be considered that those fastening means should not comprise the whole surface of the liner mat, in order to allow said mat to freely operate in absorbing the wear.

In fact, the liner system comprises a protected area and an impact and wear area, wherein the protected area comprises the elements that form the anchorage and joining assembly thereof to the liner mat, while the impact and wear area comprises the free surface of the liner mat. This arrangement allows protecting those elements that are sensitive to wear by impact, abrasion or spoiling, reducing the possibility of damage and obstruction of the articulated or pivoting joint. Additionally, the definition of an impact and wear area allows the liner mat to be reinforced in said area, increasing the number of layers, changing the type of material or its properties and/or including reinforcement materials embedded in said area.

With respect to this, an alternative embodiment of the invention comprises the fastening means as arranged embedded inside the liner mat, arranged at the time the mat is manufactured. Under said embodiment, the fastening means should project from an end of the mat for its connection to the rest of the anchorage assembly components, in particular the first part of said assembly.

In this respect, the first part of the anchorage assembly also comprises a first half of the articulated or pivoting joint of the anchorage assembly, with said first half being fixedly joined to the fastening means by welding, another conventional joining mechanism or totally formed by said means. Said joining carries the mechanical stresses of the liner system to the second half of the articulated or pivoting joint, which in turn comprises the supporting means of the second part of the anchorage assembly.

In addition, according to the preferred embodiment of the invention, the supporting means of the second part of the anchorage assembly are fixed to a reference surface of the mining equipment to be protected, wherein said reference surface can be part of said equipment, of the structure supporting it or the ground on which the mining equipment is mounted. For example, in the event of protection of the chute of a primary crusher, the at least one supporting means of the anchorage assembly can be anchored whether at the upper part of the chute walls or directly over the cup wherein the primary crusher is framed providing the liner mat in an articulated way over the surfaces to be protected. Additionally, according to a second example of this embodiment, the at least one supporting means of the second part of the anchorage assembly can be anchored to a wall of the chute providing the liner mat in an articulated way over the chute wall. In fact, the liner system of the present invention can be implemented in several mining equipment, such as chutes, crushers and bins, among others.

In this respect, for any of said mining equipment, the fixation of the at least one supporting means for the second part of the anchorage assembly over the reference surface of the mining equipment is performed by common anchorage or fixing means, as bolts and/or weld, among others, wherein said fixation to the reference surface should be designed to bear the weight of the liner system and the mechanical stresses generated during the operation. A robust fixation to the reference surface of the mining equipment should be considered.

Additionally, according to the preferred embodiment of the invention, the second part of the anchorage assembly comprises the second half of the articulated or pivoting joint of the liner system, wherein said second half is made up by the same supporting means provided for the anchorage of the liner system to the reference surface of the mining equipment. In this respect, the connection between the first and the second half of the articulated or pivoting joint—wherein the second half is fixed to the reference surface of the mining equipment through the supporting means of the anchorage assembly—allows the first part of the anchorage system to pivot around said joint together with the liner mat with a liner system being provided over the mining equipment surface.

The articulated or pivoting movement allowed by the liner system of the present invention solves the problems of the prior art as to an easy installation and maintenance of the system, getting to reduce the unavailability time of the equipment as a result of said operations. In addition, the liner system of the present invention enables the use of a big mat formed just in one piece, thus dramatically reducing the number of mats required to line the total surface desired.

Considering the above, the present invention comprises a method to install the liner system described above, wherein said installation method is founded on the essential characteristics of the liner system. In this context, the installation method of the liner system over the surface of mining equipment for the protection of said surface subject to impact and abrasive wear comprises the steps of:

Fixing at least a supporting means of the second part of the anchorage assembly to the reference surface of the mining equipment;

Fixing the liner mat to the at least one fastening means of the first part of the anchorage assembly;

Joining the first part of the anchorage assembly that comprises the mat provided in the at least one fastening means, with the second part of the anchorage assembly, which at least one supporting means is fixed to the mining equipment, and Placing the liner mat fixed to the anchorage assembly over the mining equipment surface to be protected, driving the joint between the first part of the anchorage assembly and the second part of the anchorage assembly.

In this respect, the steps to fix the supporting means and the liner mat comprise the use of common fixing means, as bolts and/or welds, according to that indicated above. In this respect, fixing the supporting means to a reference surface of the mining equipment can comprise the actions of drilling said reference surface for the robust anchorage of the system and leveling the supporting means in order to ensure that the articulated or pivoting joint allows the free rotation among the components.

According to an alternative embodiment of the present invention, the step of fixing the liner mat to the first part of the anchorage assembly can be performed out of the worksite or operation, being carried as just one piece for the time of installation. In this respect, the joint formed by the liner mat is fixed to the first half of the anchorage assembly, which for these purposes will be called liner assembly, it can join to the second half of the anchorage assembly at the site of installation itself, using for that purpose handling means allowing to positioning the liner assembly and aligning the first half of the articulated or pivoting joint to the second half of said joint, thus completing the connection between said halves at the site of installation itself. The handling means can comprise the use of a crane allowing to lifting and displacing the liner assembly for its installation.

Additionally, the step of joining the first part of the anchorage liner to the second part thereof, wherein the first part fastens the liner mat, comprises arranging the articulated or pivoting joint between said first and second parts. Said articulated or pivoting joint has a first half fixed to the first part of the anchorage assembly, in particular to the fastening means, and a second half fixed to the second part of the anchorage part, in particular to the fastening means, wherein said first and second halves are connected through an articulated or pivoting joint allowing the articulated or pivoting movement of the first half of the anchorage assembly with respect to the second part of said assembly, which is fixed to a reference surface of the mining equipment.

In addition, the joining step between the components of the anchorage assembly comprises the introduction of a pin between the first and the second half of the pin. The pin can be introduced in the applicable halves of the joint when the liner anchorage is placed aligned with the supporting means previously fixed to the reference surface.

Additionally, the present invention comprises a maintenance method of the articulated liner system described above, wherein said method facilitates the maintenance of the system in the mining equipment. According to the present invention, the maintenance method comprises the steps of:

Lifting from the mining equipment surface the liner mat fixed to the first part of the anchorage assembly, driving the joint between the first part of the anchorage assembly and the second part of the anchorage assembly, while said second part of the anchorage assembly remains fixedly joined to the reference surface of the mining equipment;

Separating the joint between the first part of the anchorage assembly and the second part of the anchorage assembly, and Removing the first part of the anchorage assembly fixed to the liner mat.

In this respect, the step of lifting the liner mat fixed to the first part of the anchorage assembly, which is for these purposes called liner assembly, comprises the use of handling means, as a crane, for the lifting and driving of the articulated or pivoting joint. Then, when the crane bears the full weight of the liner assembly, i.e. when said liner assembly is in vertical position, the operators can separate the first part of the anchorage assembly from the second part thereof by disassembling or separating the articulated or pivoting joint that keeps said first and second parts joined.

According to an alternative embodiment of the invention, the liner system includes at least a lifting device provided to lift the liner mat joined to the first part of the anchorage assembly by driving the articulated or pivoting joint, wherein said lifting device is arranged along with the mining equipment in order to drive the rotation of the articulated joint directly or to exert lifting pressure directly on the mat and/or anchorage mat. This device enables the temporary lift of the liner assembly for the purposes of routine maintenance tasks, for example removing the ore particles that can be present between the surface of the mining equipment and the liner mat.

Additionally, the maintenance method of the present invention allows having a stock of liner assemblies (liner mat joined to the first part of the anchorage assembly) available for the replacement of the component in the event of major maintenance. This configuration reduces the time required for the replacement of the liner assembly dramatically with respect to the replacement of the rubber plates considered in the prior art.

Finally, the invention comprises a manufacturing method of the articulated liner system according to the above description, wherein said manufacturing method comprises the steps of:

Forming the mat over a cylindrical mandrel by displacing an extruder with respect to the mandrel, wherein said mandrel rotates as the mat is formed over its surface, Curing the mat already formed, Removing the mat from the mandrel, Providing an anchorage assembly that comprises a first part and a second part joined to the first in an articulated or pivotal way, wherein the first part comprises at least a liner fastening means and the second part comprises at least a supporting means for the anchorage assembly; and Fixing the liner to the fastening means of the first part of the anchorage assembly.

According to an embodiment of the invention, the step of forming the liner over the cylindrical mandrel of the manufacturing method comprises the displacement of the extruder over the mandrel at least twice without rotating the mandrel, i.e. over the same surface of the liner being formed, providing a two-layer structure over said same surface. This method can be applied in the whole extension of the liner, if a full two-layer thick liner is desired, or in part of the liner, if reinforcing a specific part is desired. Alternatively, an embodiment of the invention comprises forming a third layer with the extruder, wherein said third layer is arranged over at least part of the second layer for the purposes of reinforcing a specific zone of the mat.

In this respect, an expert in the art will understand that several configurations of a mat can be used employing one or several layers of rubber or intercalating reinforcement of other material among said layers. In this respect, the manufacture method of the invention allows making big-sized mats in just one piece, of one or more layers with special configurations of thickness distribution and/or reinforcement materials.

In this same context, an alternative embodiment of the invention comprises that the fastening means of the anchorage assembly are formed embedded in the liner mat; to this effect, said intercalated means are arranged between one or more mat-forming layers. Then, after curing the mat, said fastening means become fixed inside the same, exposing a free end for the connection to the other components of the anchorage assembly.

Considering the above, both the system of the invention and the method of installation, maintenance and manufacture already described, allow solving the problems described in the known prior art by implementing a combination of mat with an anchorage assembly that allows the articulated fixation of the mat with respect to a reference surface of a mining equipment. Additionally, the expert in the art will understand that any variation and/or combination of equivalent technical components considered evident by said expert, is within the scope defined for the present invention.

BRIEF DESCRIPTION OF FIGURES

As part of the present application the following representative figures of the invention are presented, which show the preferred embodiments of the same and, therefore, they should not be considered as restricting the definition of the invention.

FIGS. 6a, 6b and 6c show a preferred embodiment of the installation method of the liner assembly of FIG. 1a in mining equipment.

FIGS. 7a and 7b show the articulated or pivoting action of the liner assembly of FIG. 1b with respect to the supporting means of FIG. 1b.

DESCRIPTION OF A PREFERRED EMBODIMENT OF THE INVENTION

Figure 1A:
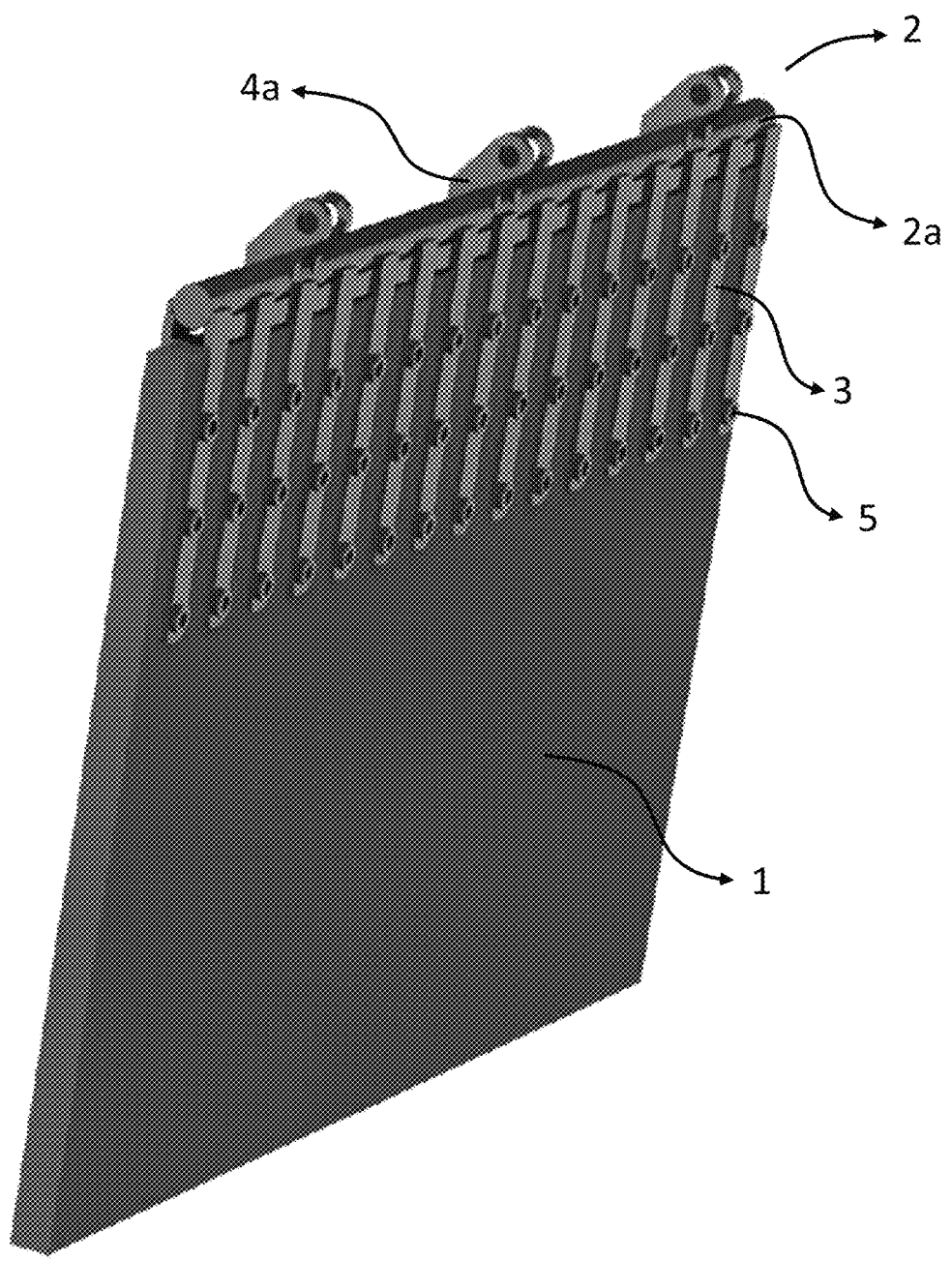
FIG. 1a shows a preferred embodiment of the first part of the anchorage assembly joined to the liner mat called liner assembly.
Figure 1B:
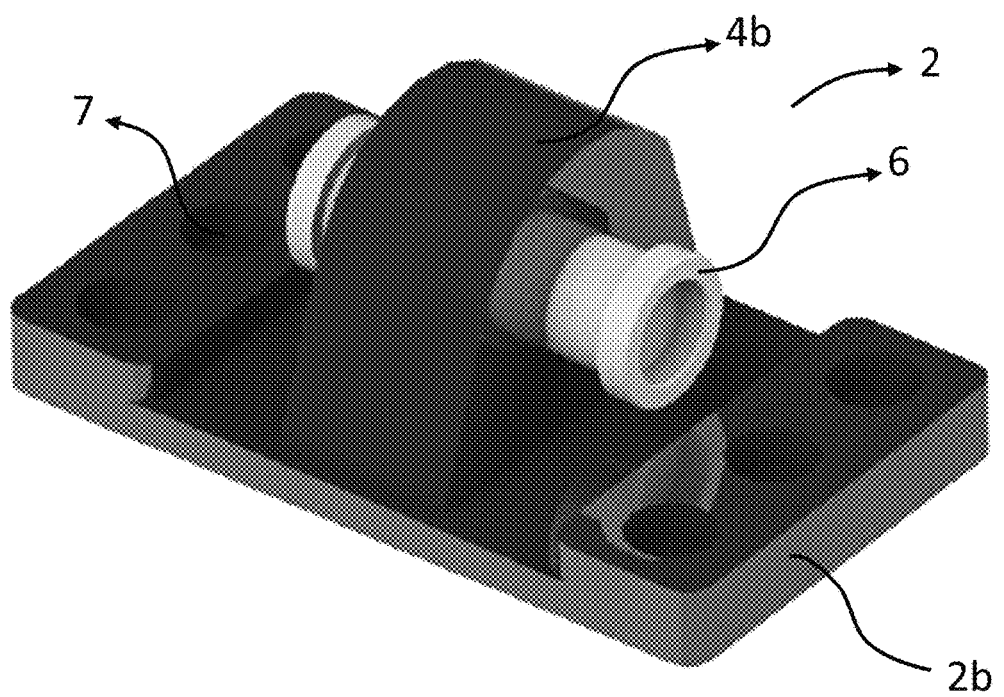
FIG. 1b shows a preferred embodiment of the second part of the anchorage assembly, in particular the supporting means.

FIGS. 1a and 1b show the articulated liner system according to a preferred embodiment of the present invention. FIG. 1a in particular shows a liner mat 1 joined to a first part 2a of the anchorage assembly. Said first part 2a comprises fastening means 3 provided to lodge the liner mat 1 fixedly inside the fastening means. According to the preferred embodiment of the invention, the fastening means 3 are a plurality of fastening brackets arranged in the upper portion of the liner mat 1. In this context, the extension of the fastening means 3 over the liner mat 1 is designed to allow bearing the weight of the liner mat and to offer an impact and wear area free from external elements for the liner mat 1.

In this respect, in the preferred embodiment shown in FIG. 1a, the use of fixing means 5 can be noted for fixing the liner mat 1 to the fastening means 3 of the mounting assembly 2, wherein said fixing means 5 can comprise bolts or another fixing element technically equivalent.

In addition, in FIG. 1a it can be noted that the first part 2a of the anchorage assembly 2 of the invention also comprises a first half 4a of the articulated or pivoting joint, with the second half 4b being in the second half 2b of the mounting assembly 2, as noted in FIG. 1b. In this respect, FIG. 1b shows how, according to the preferred embodiment, the second part 2a of the anchorage assembly incorporates in a single component both the supporting means and the second half 4b of the joint.

Additionally, in FIG. 1b the use of a pin 6 can be noted as the rotation axis of the articulated or pivoting joint 4, wherein said pin 6 is the element comprising the connection that configures the anchorage assembly 2. In addition, the fastening means or the second part 2b comprises fastening means 7 for the anchorage of said component over the reference plane of the mining equipment to be protected.

Figure 2:
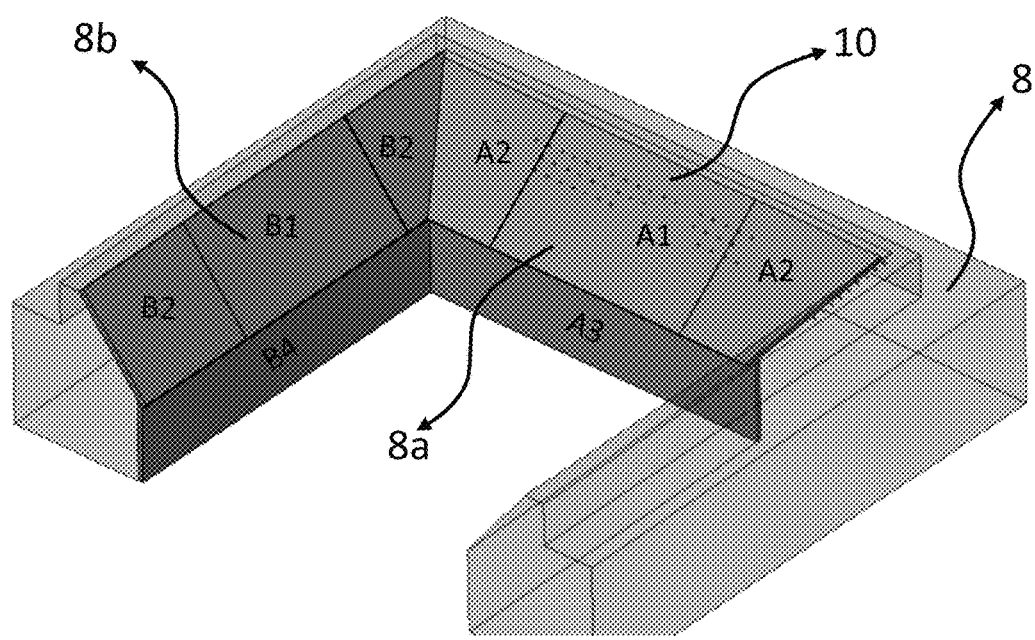
FIG. 2 shows the arrangement of the liner mats over surfaces of the mining equipment, in particular the chute of a crusher.

With reference to FIG. 2, the arrangement of the liner system 10 of the invention in the cup or loading chute 8 of a primary crusher can be noted, becoming clear that the liner system 10 requires a reduced number of units in order to line the total surfaces 8a, 8b of said loading chute 8.

Figure 3A:
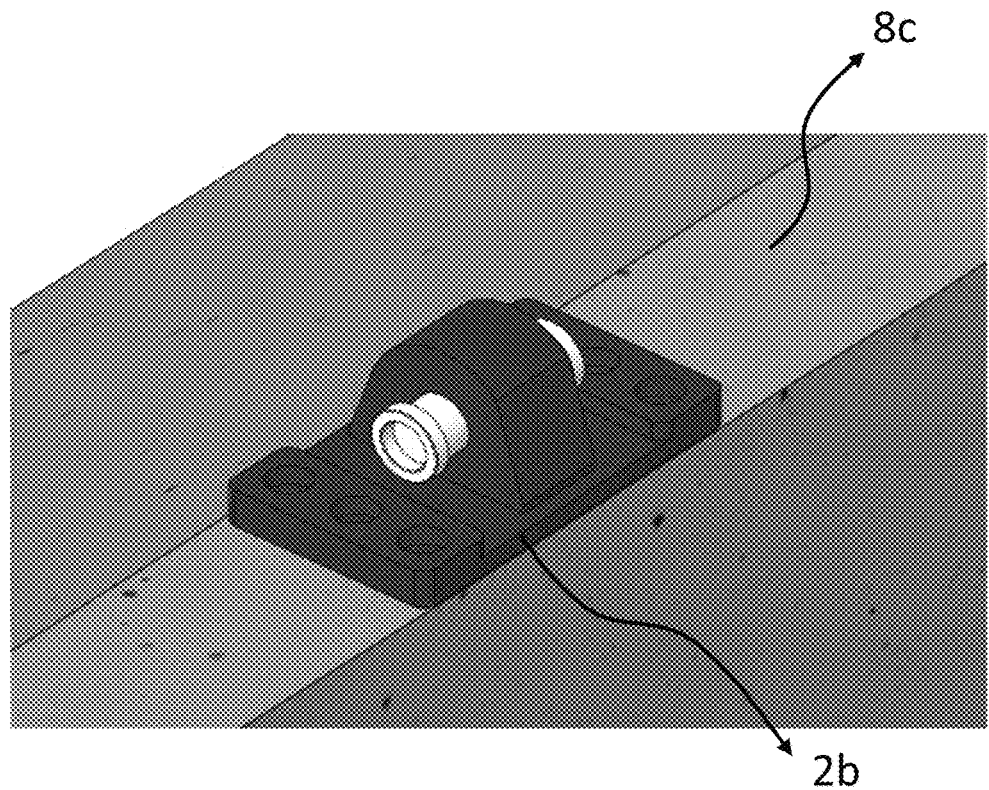
FIGS. 3a and 3b show the mounting of the fastening means of FIG. 1b over a reference surface of the mining equipment.

FIG. 3a shows the arrangement of the supporting means 2b of the anchorage assembly 2, being it possible to evidence that the fixing and anchorage of said component is performed over a reference surface 8c of the mining equipment to be lined. In this context, FIG. 3b shows the arrangement of a plurality of supporting means 2b over the reference surface 8c.

Figure 3B:
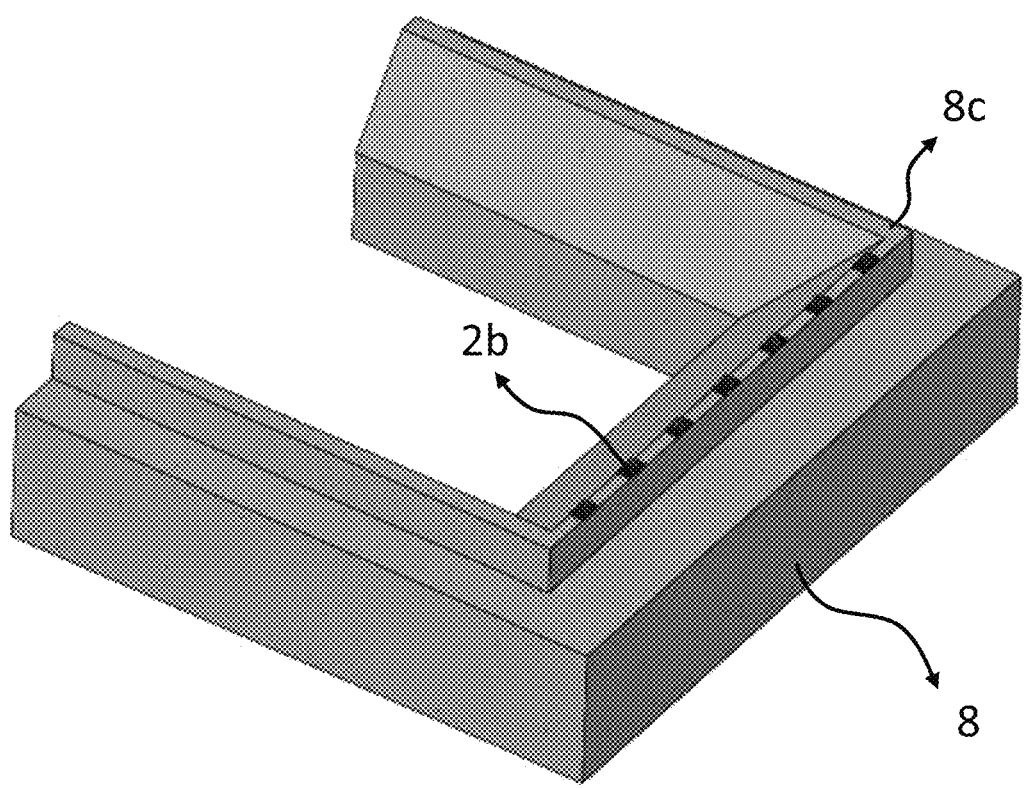
Figure 4A:
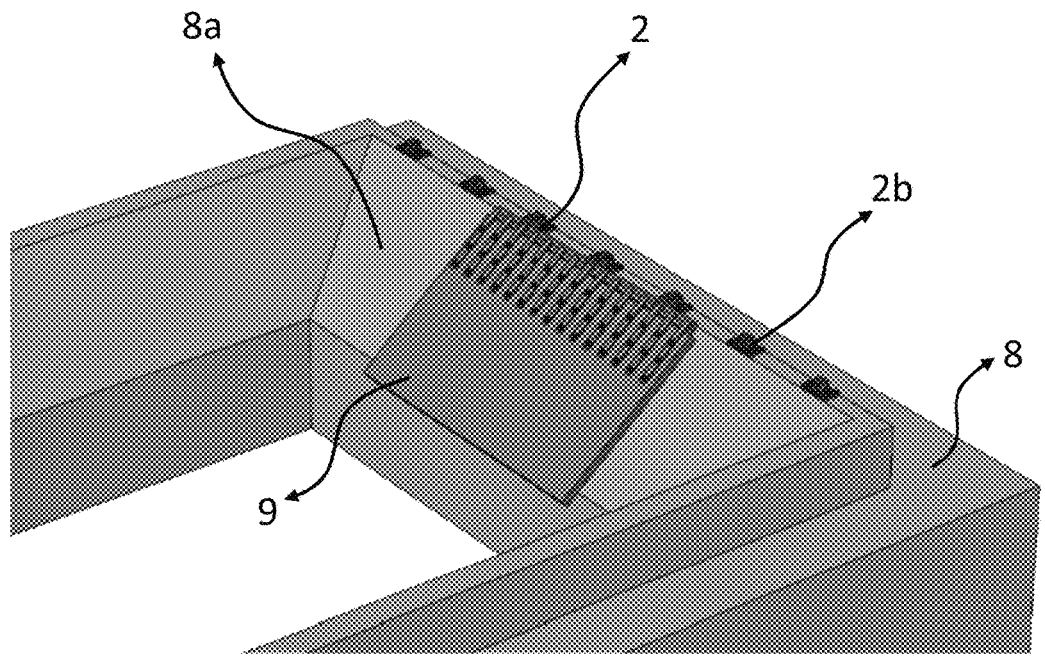
FIGS. 4a and 4b show the mounting of the liner assembly of FIG. 1a over the surface of the mining equipment.
Figure 4B:
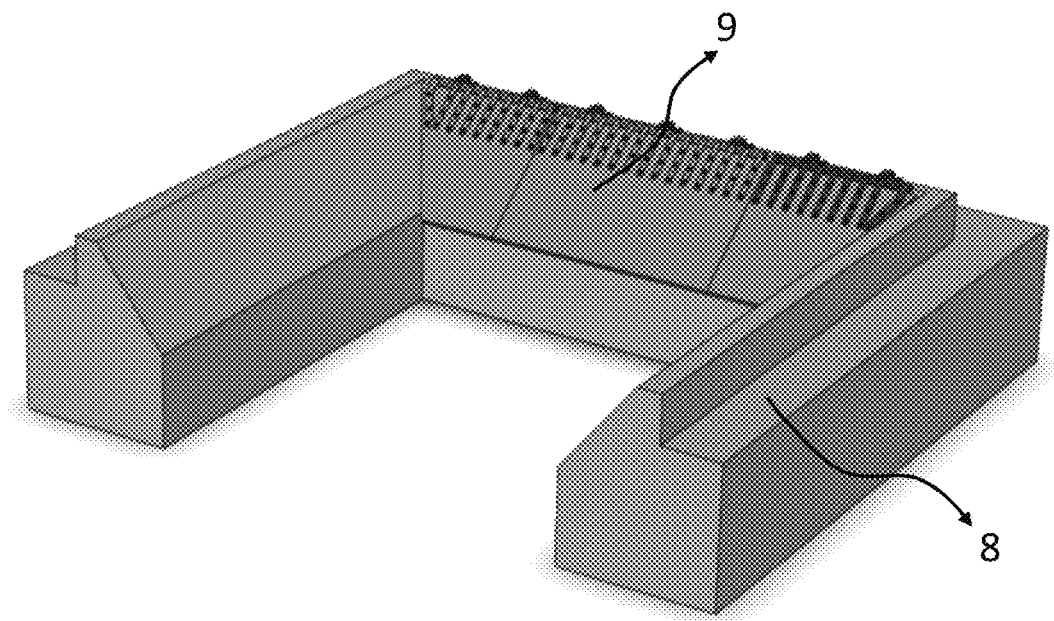

Here it is important to point out that the sequence of FIGS. 3a and 3b depicts the mounting of the anchorage assembly 2 of the present invention, starting from the fixation of the second part 2b of said assembly. Continuing with this point, FIG. 4a shows the lining of at least part of surface 8a of a loading chute 8a through an assembly formed by the liner mat 10 and the first part of the anchorage assembly 2a, wherein the joint of said components is called a liner assembly 9. In this context, the joint between the liner assembly and the supporting means 2b forms the liner system of the invention. FIG. 4b shows the use of other liner assemblies 9 to cover the total surface 8a of the loading chute 8.

Figure 5A:
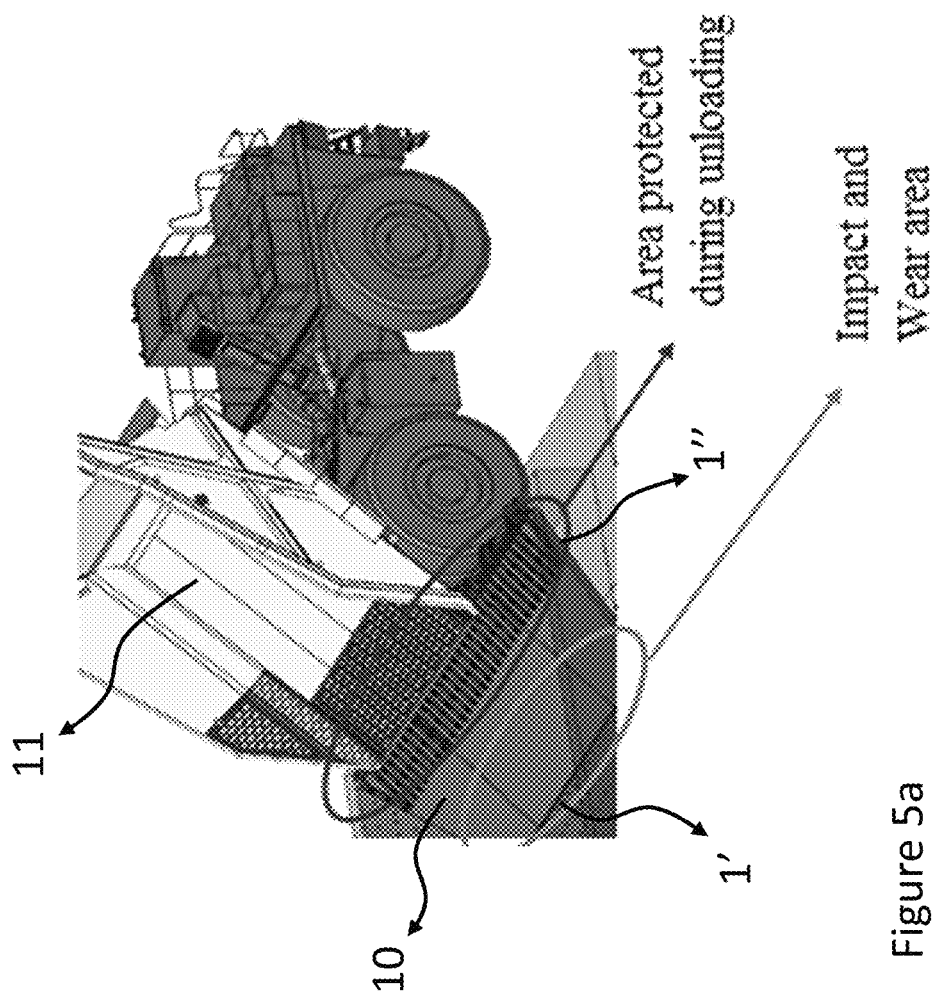
FIGS. 5a and 5b show the operation of the liner system according to an embodiment of the invention, identifying the area protected and the area of impact and wear of said system.
Figure 5B:
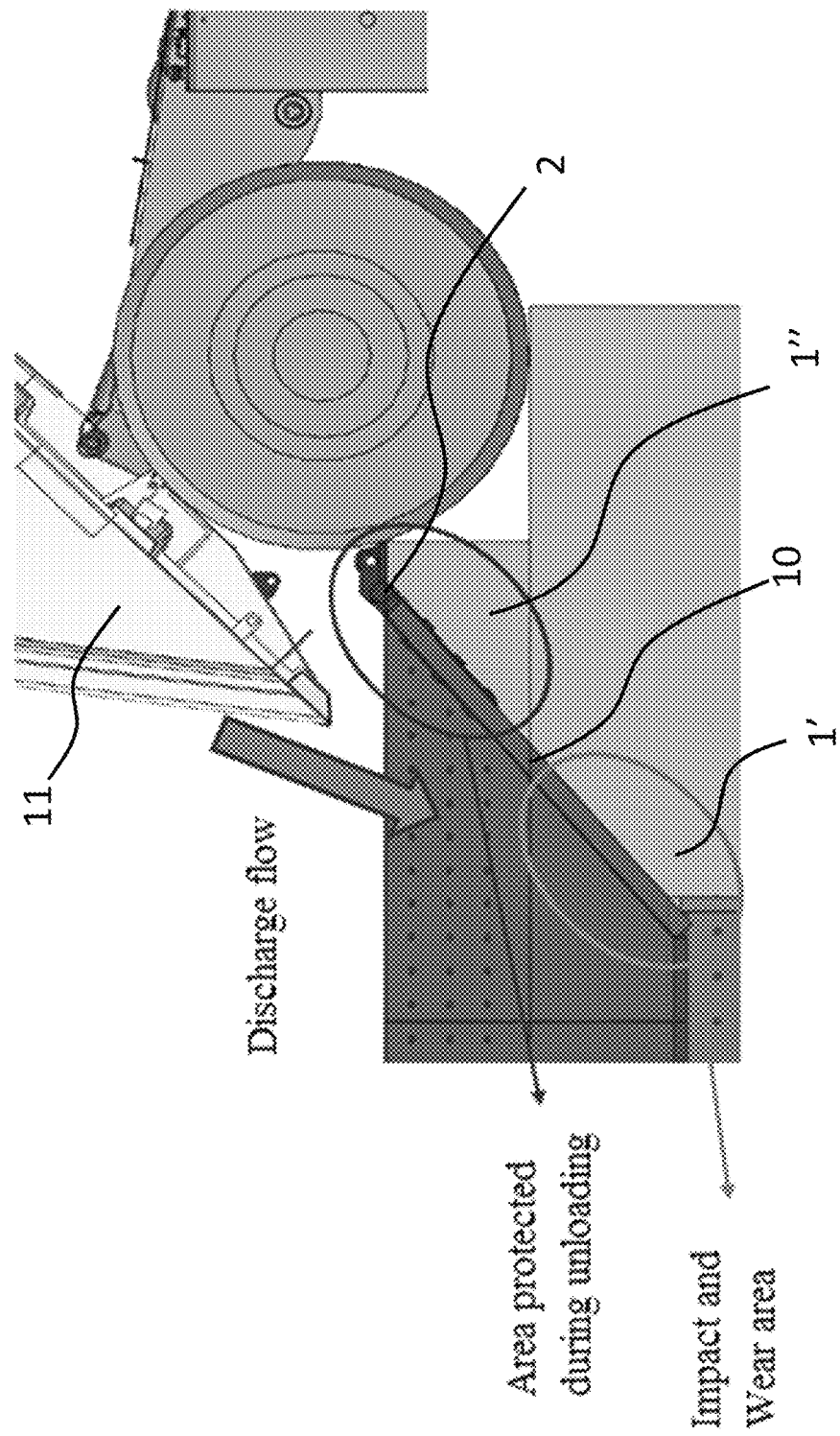

With respect to the operation of the system of the invention, FIGS. 5a and 5b show the action of the liner system 11 in the event of an ore unloading operation from a bin 11. In this respect, in FIG. 5b, it can be noted in detail that the discharge flow from bin 11 impacts the liner system 10, in particular in the liner mat, in an area called impact and wear area 1'. Said area of impact and wear 1' is the area with the greatest work of the liner system, offering a wear area of the liner mat 1 that is free of any other element. In this respect, in FIG. 5b it can be noted that the elements that form the anchorage assembly 2 of the invention there is a protected are in unloading 1". This area has little probability of receiving the impact of the ore that is discharged from the bin 11. In fact, according to the preferred embodiment, said protect area in unloading 1" is configured in that way, because it is below the bin 11 from which the ore is discharged, i.e. near the ore unloading point. This is why the same configuration of the system allows protecting said impact area during the unloading over the liner system.

Figure 6A:
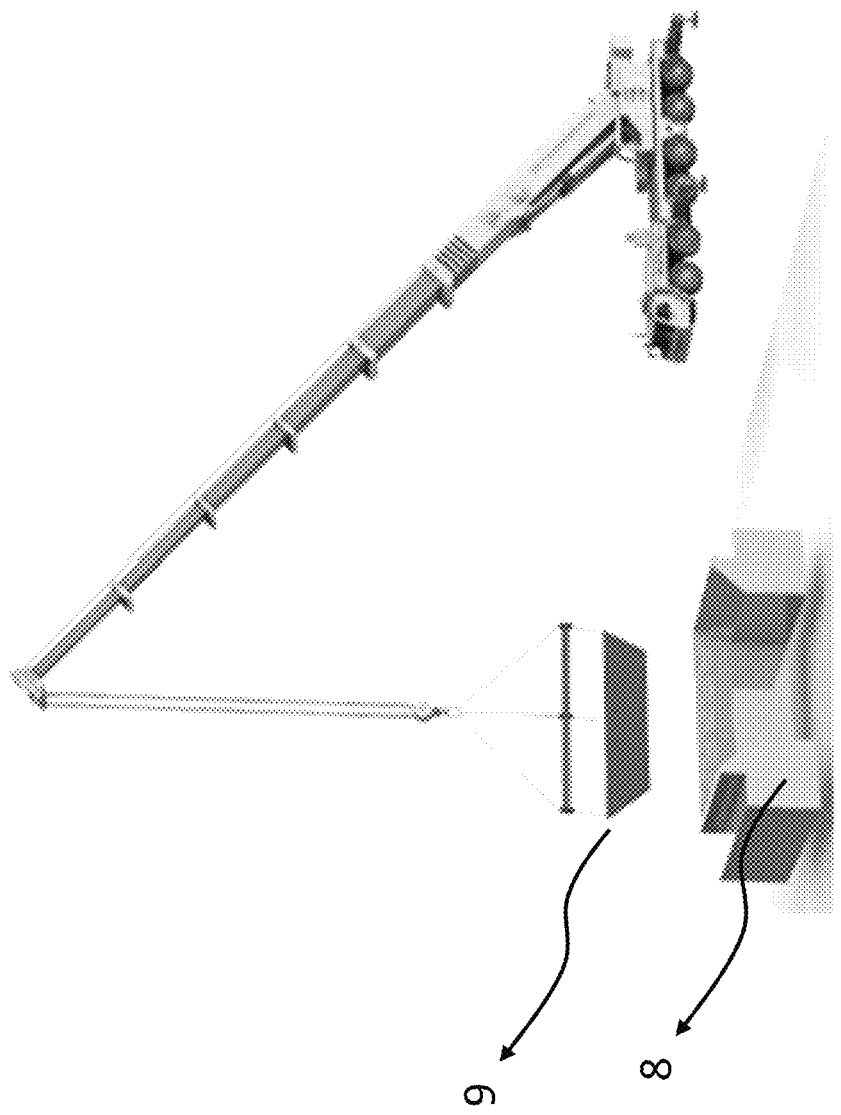
Figure 6C:
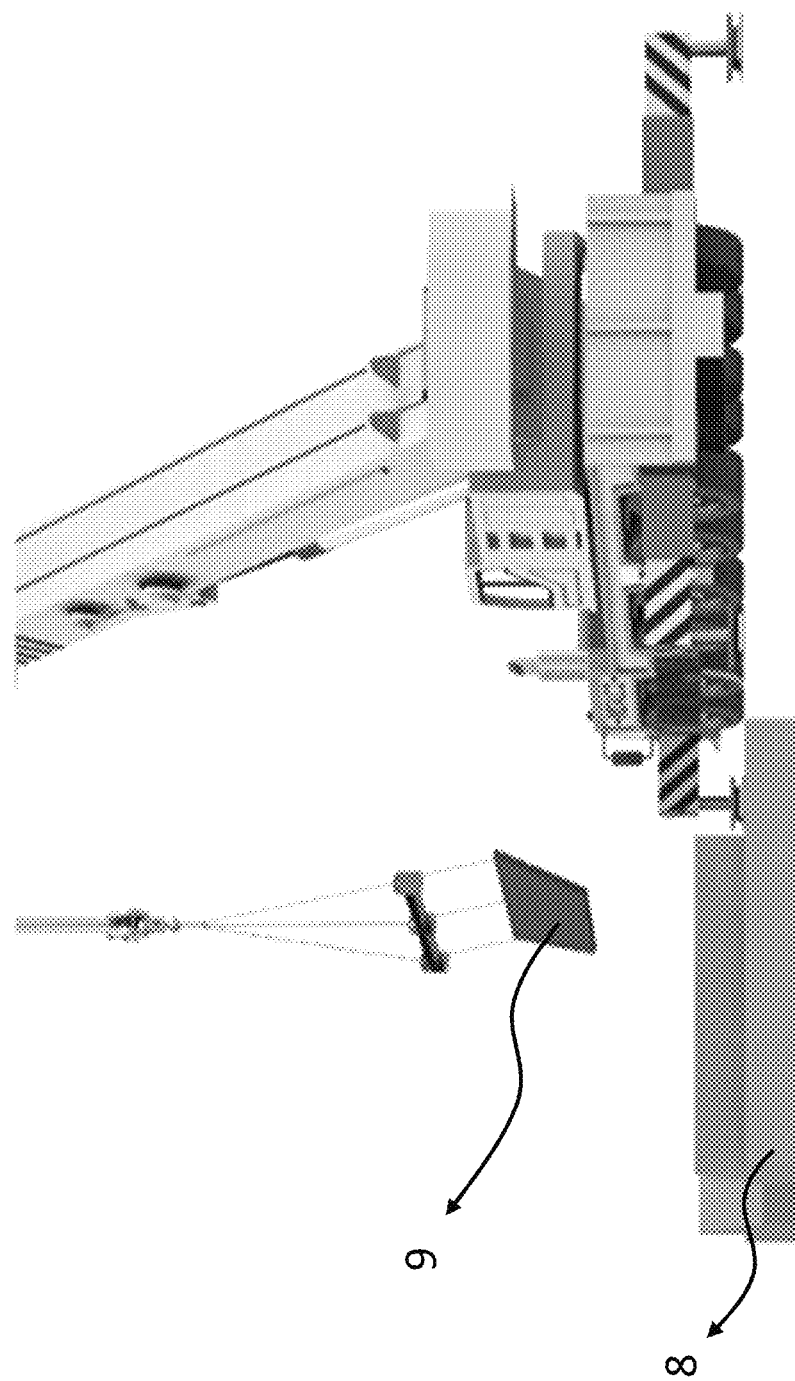

With respect to FIGS. 6a, 6b and 6c, said figures show the installation and/or maintenance of the invention's liner system, wherein a handling means 12 is used, such as a high-tonnage crane, for lifting and placing the liner assembly 9 on the mining equipment on which it will be installed. In this respect, FIGS. 6b and 6c show the alignment of said liner assembly 9 over the mining equipment, particularly over the chute 8 in such a position that the later mounting becomes easier between the first and the second part (2a, 2b) of the anchorage assembly.

Figure 7A:
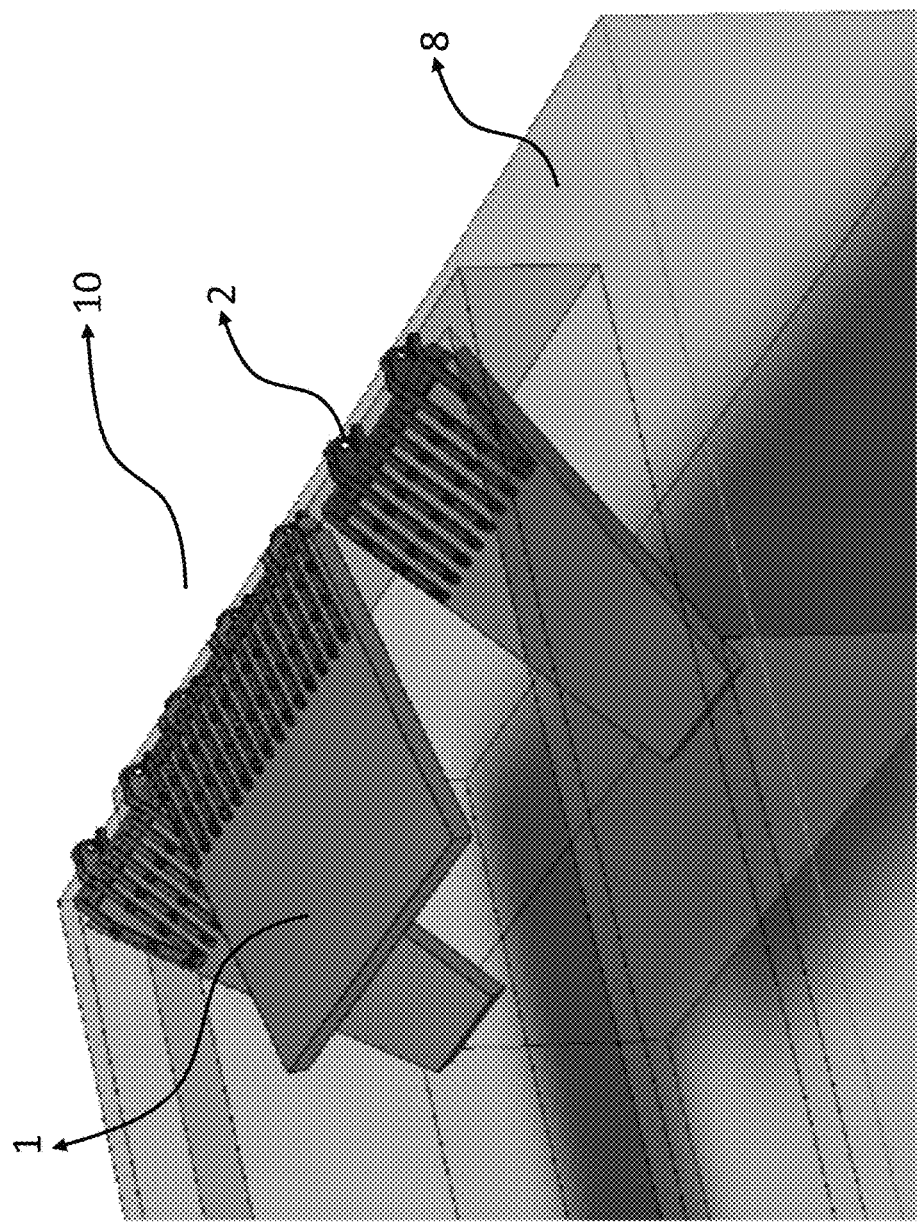

Considering the above, FIGS. 7a and 7b show the final result of the liner system mounting 10 of the invention, wherein the liner mat 1 joined to the anchorage assembly 2—which is in turn joined to a mining equipment 8—form an articulated liner system that enables a pivotal movement around the anchorage assembly 2, in particular over the articulated or pivoting joint of said assembly. This solution offers the possibility of installing big-sized and one-piece liner mats 1 as active elements in the protection of mining equipment surfaces. Thus, a liner system easy to install and maintain is configured.

It is evident that other embodiments of the invention result from the technical definition of the invention proposed above. In fact, the preferred embodiment described herein should not be understood as limiting the scope of the present invention, which is configured from the set of claims presented below.

The invention claimed is:

1. An articulated liner system for the protection of mining equipment surfaces subject to impact and abrasive wear caused by the circulation, loading and transport of materials or ores, facilitating the installation and maintenance of the system in the mining equipment, comprising:
    a one-piece liner mat; and
    an anchorage assembly comprising at least two parts, with a first part at least having one mat fastening means and a second part having at least one supporting means for the anchorage assembly, wherein said supporting means is fixed to a reference surface of the mining equipment;
    wherein the liner mat is fixedly arranged in the at least one fastening means of the first part of the anchorage assembly, and wherein the first part of the anchorage assembly is joined to the second part of the anchorage assembly, enabling the mat to be arranged over the mining equipment surface when a joint between the first and the second parts of the anchorage assembly is driven.

2. The articulated liner system according to claim 1, wherein the joint between the first and the second part of the anchorage assembly is articulated or pivoting, performed through a pin that forms a hinge-type connection, enabling the rotation between a first half of the joint and a second half of the joint.

3. The articulated liner system according to claim 2, wherein the second part of the anchorage assembly is fixedly arranged over the mining equipment to be protected, comprising the second half of the articulated or pivoting joint, while the first part of the anchorage assembly rotates jointly with the liner mat, which is fixedly joined to said first part, comprising the first half of the articulated or pivoting joint.

4. The articulated liner system according to claim 3, wherein the first half of the articulated or pivoting joint of the anchorage assembly is fixedly joined to the fastening means through welding, another standard joining mechanism or is integrally formed with said fastening means, wherein the second half of the articulated or pivoting joint of the anchorage assembly comprises the supporting means of the second half of the anchorage assembly.

5. The articulated liner system according to according to claim 1, wherein the fastening means of the first half of the anchorage assembly enable, fixing the liner mat to said anchorage assembly, wherein said fixation is performed through a detachable joint allowing the separation of the mat from the liner system, whether for replacement or repair, wherein said detachable joint is achieved through fastening means such as bolts or another standard fixing means, which are arranged in the fastening means for fixing the liner to the anchorage assembly.

6. The articulated liner system according to claim 5, wherein the fastening means of the first part of the anchorage assembly is made up by a fastening bracket provided to fix the liner mat to the anchorage assembly, wherein said fastening bracket has teeth that presses the liner mat on at least part of its upper portion, fixing it to the structure of the first part of the anchorage assembly by the effect of pressure among the teeth, bolts or other fastening means provided in the teeth, wherein the fastening means can comprise at least one bracket with a plurality of teeth.

7. The articulated liner system according to claim 1, wherein the fastening means are provided embedded inside the liner mat, projecting from an end of the mat for its connection to the remaining components of the anchorage assembly, in particular to the first part of said assembly.

8. The articulated liner system according to claim 1, wherein the extension of the fastening means comprises a portion of the liner mat surface.

9. The articulated liner system according to claim 1, wherein the supporting means of the second part of the anchorage assembly are fixed to the reference surface of the mining equipment to be protected, wherein said reference surface can be part of said equipment, of the structure supporting the same or the ground on which the mining equipment is mounted.

10. The articulated liner system according to claim 1, wherein the fixation of at least one supporting means of the second part of the anchorage assembly over the ground of the mining equipment surface is performed through common fastening or anchorage means as bolts and/or welds, among others.

11. The articulated liner system according to claim 1, wherein the liner mat is formed in one or more layers, wherein the additional layers of the liner mat are arranged whether locally or along the whole extension of the mat.

12. The articulated liner system according to claim 1, wherein the liner mat comprises at least a high resistance material embedded inside the mat, wherein the high resistance material is preferable a mesh made up by fibers as Kevlar® or metallic reinforcements.

13. The articulated liner system according to claim 1, wherein the liner system comprises a protected area and an impact and wear area, wherein the protected area comprises the elements that form the anchorage and joining assembly thereof to the liner mat, while the impact and wear area comprises the free surface of the liner mat.

14. The articulated liner system according to claim 1, wherein the mining equipment to be protected can be a primary crusher, a loading/unloading chute, a cup wherein the primer crusher, a bin and/or walls or surfaces of the preceding equipment are framed.

15. A method to install the articulated liner system according to claim 1, for the protection of mining equipment surfaces subject to impact and abrasive wear due to the circulation, loading and transport of ores, facilitating the installation and maintenance of the system in the mining equipment, comprising the steps of:
   fixing at least a supporting means of the second part of the anchorage assembly to a reference surface of the mining equipment;
   fixing the liner mat to the at least one fastening means of the first part of the anchorage assembly;
   joining the first part of the anchorage assembly that comprises the mat provided in the at least one fastening means, with the second part of the anchorage assembly, which at least one supporting means is fixed to the mining equipment, and
   placing the liner mat fixed to the anchorage assembly over the mining equipment surface to be protected, driving the joint between the first part of the anchorage assembly and the second part of the anchorage assembly, wherein fixing the supporting means to a reference surface of the mining equipment comprises the actions of drilling said reference surface for the robust anchorage of the system and leveling the supporting means in order to ensure that the articulated or pivoting joint allows the free rotation among the component.

16. The installation method according to claim 15, wherein the joint is performed at the site of installation itself, using for that purpose handling means allowing to positioning the liner assembly and aligning the first half of the articulated or pivoting joint to the second half of said joint, thus completing the connection between said halves at the site of installation itself.

17. The installation method according to claim 15, wherein the step of joining the first part of the anchorage liner to the second part thereof, wherein the first part fastens the liner mat, comprises arranging the articulated or pivoting joint between said first and second parts, wherein said articulated or pivoting joint has a first half fixed to the first part of the anchorage assembly, in particular to the fastening means, and a second half fixed to the second part of the anchorage part, in particular to the fastening means, wherein said first and second halves are connected through an articulated or pivoting joint allowing the articulated or pivoting movement of the first half of the anchorage assembly with respect to the second part of said assembly, which is fixed to a reference surface of the mining equipment, wherein the step of joining the components of the anchorage assembly comprises the introduction of a pin between the first and the second half of the pin, wherein said pin acts as a rotation axis between said first and second halves, wherein the pin can be introduced into the applicable halves of the joint, when the liner assembly is placed aligned with the supporting means previously fixed to the reference surface.

18. A maintenance method of the articulated liner system according to claim 1, for the protection of said mining equipment surfaces subject to impact and abrasive wear due to the circulation, loading and transport of ores, facilitating the installation and maintenance of the system in the mining equipment, comprising the steps of:
   lifting from the mining equipment surface the liner mat fixed to the first part of the anchorage assembly, driving the joint between the first part of the anchorage assembly and the second part of the anchorage assembly, while said second part of the anchorage assembly remains fixedly joined to the reference surface of the mining equipment;
   separating the joint between the first part of the anchorage assembly and the second part of the anchorage assembly, and
   removing the first part of the anchorage assembly fixed to the liner mat,
      wherein the step of lifting the liner mat fixed to the first part of the anchorage assembly, which is for these purposes called liner assembly, comprises the use of handling means, as a crane, for the lifting and driving of the articulated or pivoting joint, wherein the crane bears the full weight of the liner assembly, i.e. when said liner assembly is in vertical position, the operators can separate the first part of the anchorage assembly from the second part thereof by disassembling or separating the articulated or pivoting joint that keeps said first and second parts joined.

19. The maintenance method according to claim 18, wherein the liner system includes at least a lifting device provided to lift the liner mat joined to the first part of the anchorage assembly by driving the articulated or pivoting joint, wherein said lifting device is arranged along with the mining equipment in order to drive the rotation of the articulated joint directly or to exert lifting pressure directly on the mat and/or anchorage mat enabling the temporary lift of the liner assembly.

20. A manufacturing method of the articulated liner system according to claim 1 for the protection of said mining equipment surfaces subject to impact and abrasive wear due to the circulation, loading and transport of ores, facilitating the installation and maintenance of the system in the mining equipment, comprising the steps of:

forming the mat over a cylindrical mandrel by displacing an extruder with respect to the mandrel, wherein said mandrel rotates as the mat is formed over its surface, curing the mat already formed, removing the mat from the mandrel, providing an anchorage assembly that comprises a first part and a second part joined to the first in an articulated or pivotal way, wherein the first part comprises at least a liner fastening means and the second part comprises at least a supporting means for the anchorage assembly; and fixing the liner to the fastening means of the first part of the anchorage assembly.

21. The manufacture method according to claim 20, wherein the step of forming the liner over the cylindrical mandrel comprises the displacement of the extruder over the mandrel at least twice without rotating the mandrel, providing a two-layer structure, wherein the layers can be applied all over the liner if a full two-layer thick liner is desired or over part of the layer if the reinforcement of a specific part is desired.

22. The manufacture method according to claim 21, wherein a third layer is formed with the extruder, wherein said third layer is arranged over at least part of the second layer.

23. The manufacture method according to claim 21, wherein several configurations of mats can be used by employing one or several layers of rubber or by intercalating reinforcements of other materials among said layers.

24. The manufacture method according to claim 20, wherein the fastening means of the anchorage assembly are formed embedded in the liner mat, to which effect said intercalated means are provided between one or more liner-forming layers.

* * * * *